United States Patent [19]

Véré et al.

[11] Patent Number: 4,530,146

[45] Date of Patent: Jul. 23, 1985

[54] PROCESS AND APPARATUS FOR ASSEMBLING THE STRIPS OF A GRILLE

[75] Inventors: Bernard Véré, Eybens; Maura Biryoukoff, Limonest; Paul Mathevon, Bollene, all of France

[73] Assignee: Cogema and Framatome, Villacoublay, France

[21] Appl. No.: 532,930

[22] Filed: Sep. 16, 1983

[30] Foreign Application Priority Data

Sep. 16, 1982 [FR] France .................. 82 15662

[51] Int. Cl.³ .................. B23Q 3/00; B23P 17/00; B23P 15/12
[52] U.S. Cl. .................. 29/468; 29/400 N; 29/160; 29/464; 29/723; 29/429
[58] Field of Search .............. 29/468, 464, 465, 466, 29/467, 469, 160, 509, 723, 771, 780; 376/442, 441; 29/400 N, 429

[56] References Cited

U.S. PATENT DOCUMENTS

| Re. 30,247 | 4/1980 | Andrews et al. | 376/442 |
| 2,849,943 | 9/1958 | Zurawski | 29/160 X |
| 2,896,311 | 7/1959 | Stafford et al. | 29/468 X |
| 4,079,497 | 3/1978 | Jernigan | 29/469 X |

FOREIGN PATENT DOCUMENTS

| 1262749 | 6/1965 | Fed. Rep. of Germany . | |
| 1592605 | 6/1970 | France . | |
| 0053585 | 4/1977 | Japan | 29/771 |
| 0028075 | 3/1981 | Japan | 29/160 |
| 386110 | 9/1973 | U.S.S.R. | 29/468 |

Primary Examiner—Carl E. Hall
Assistant Examiner—John T. Burtch

[57] ABSTRACT

Apparatus and means for assembling strips in grilles, comprising a carriage (24) displaceable vertically on a sub-frame, and a device (26) displaceable horizontally on the sub-frame parallel to the slots in the strips, and comprising a table equipped for receiving and centering a strip, and for enabling a frame forming an assembly jig to be retained in successive predetermined positions in which the slots in the strips carried by the frame face the path of the strip carried by the movable device.

8 Claims, 8 Drawing Figures

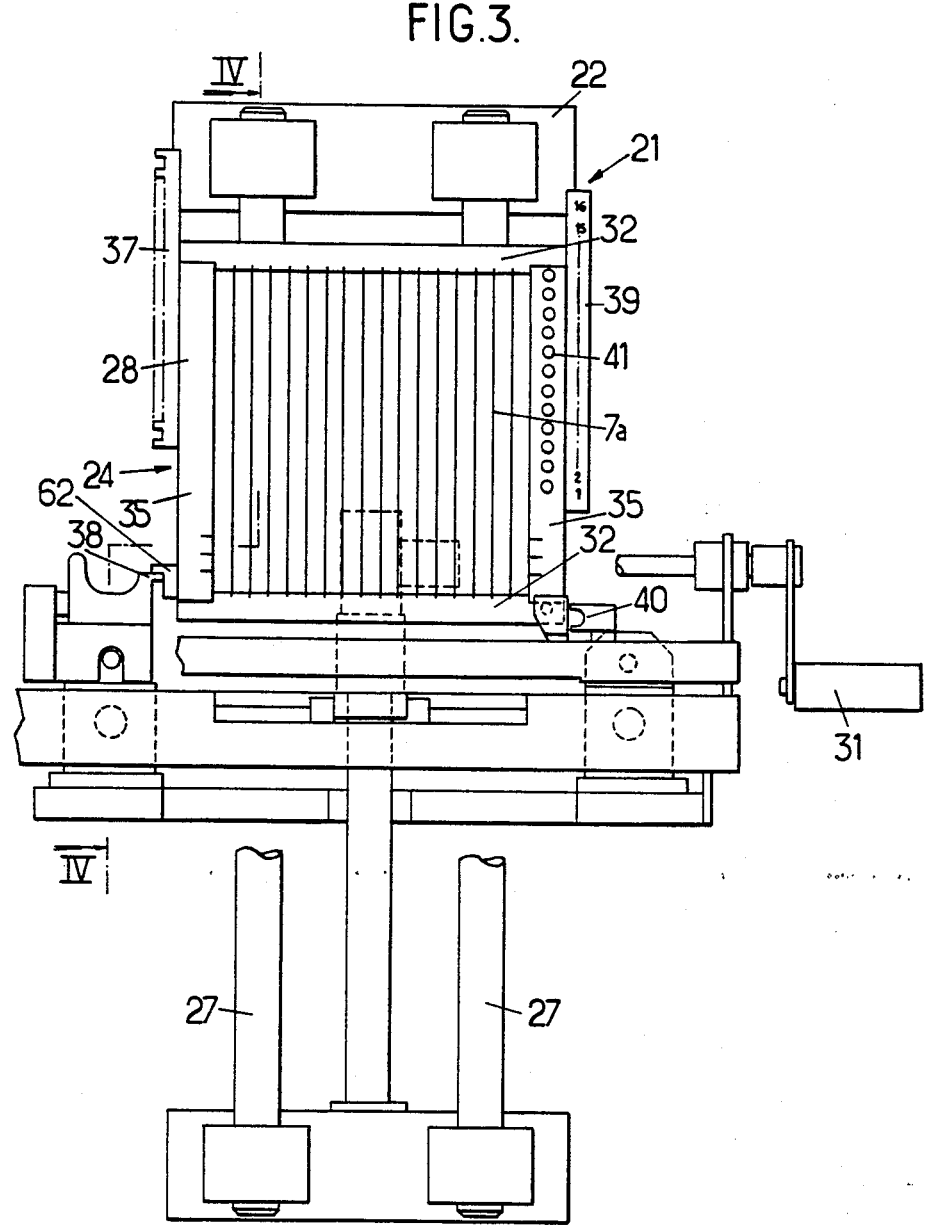

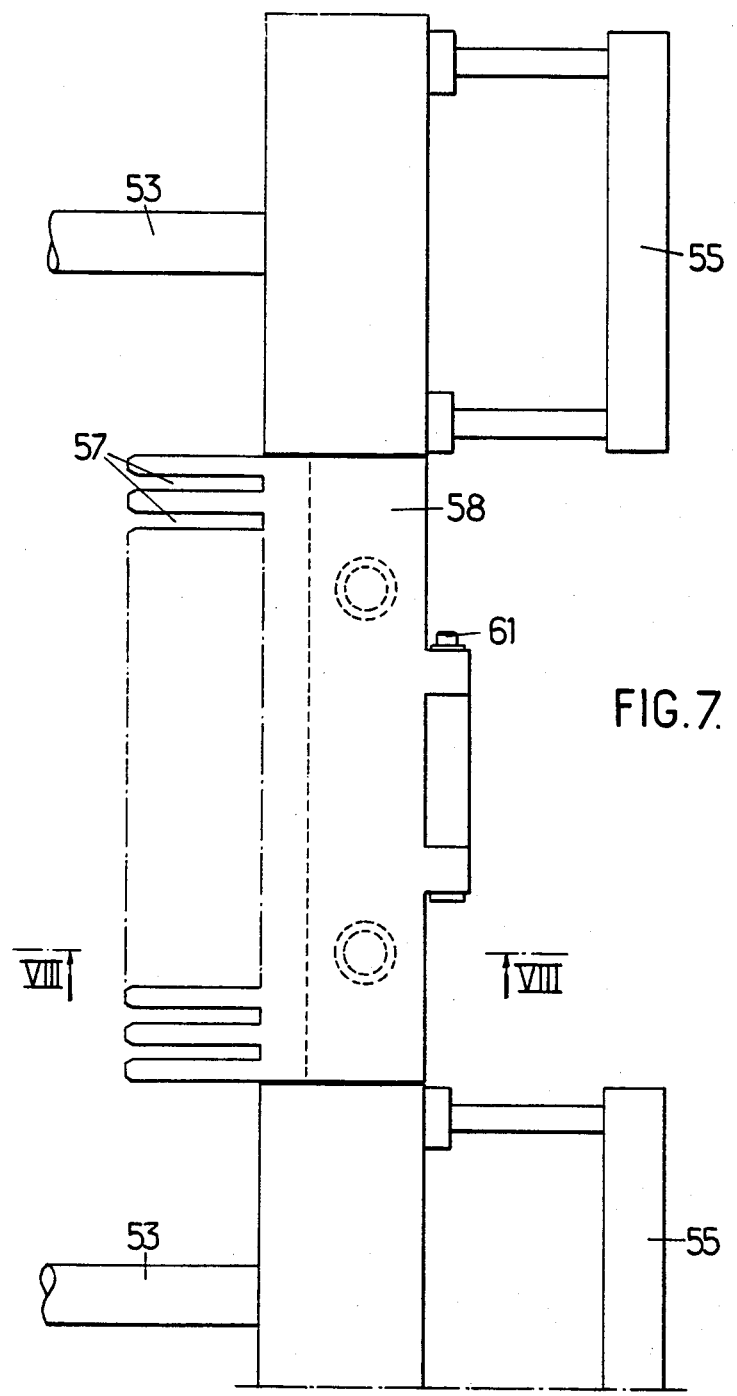

PROCESS AND APPARATUS FOR ASSEMBLING THE STRIPS OF A GRILLE

FIELD OF THE INVENTION

The present invention relates to the assembly of strips to form a grille of the type used in the fuel assemblies of nuclear reactors, these grilles having the task of keeping the fuel rods of the assembly in a regular lattice configuration.

The object of the invention is more particularly a process and apparatus enabling the individual strips to be assembled precisely in two orthogonal directions, eliminating all errors in the distribution of the strips, before welding them together to join them in a definitive manner.

BACKGROUND OF THE INVENTION

At the present time the strips are assembled manually in a process which is slow, calls for very competent operatives and does not guarantee absolutely regular geometry. The steps in this process are the following: an operative arranges a first set of strips parallel to each other in the grooves of an assembly jig. Once this operation, which may be compared to the setting up of the warp threads in the textile industry, has been completed, the operative arranges the strips which form a second set one by one, which may be compared to inserting the weft threads in woven material. To allow this assembling each of the strips of the first set has slots which co-act with complementary slots in the strips of the second set, providing lap-jointed fixing. Once all the strips are in place, a second assembly jig with identical grooves to those in the first is placed on the two sets of grille strips to maintain the intersection during the following stages for finishing the grille, which consist of setting in place four external framing strips, and the welding process.

Despite the fact that the operative is able to assess by his sense of touch the insertion force which he is exerting on the strips of the second set, local deformations may occur due especially to the fact that the strips in the first set are not held precisely in place while the second set is being inserted, and faults may result in the alignment of the slots receiving one and the same strip of the second set. Furthermore, when, as frequently happens, not all the strips in a grilles are identical, there is a very real danger of error in the choice of the strip to be placed in a given position.

The object of the present invention is to provide a process and assembly apparatus which are better adapted to practical requirements than those known previously, notably in that they eliminate, or at least attenuate to a large degree, the above-mentioned disadvantages. More particularly, the object of the invention is to provide a process and apparatus which make it possible to guarantee an exact, constant and precise geometry for the assembly.

To this end the invention proposes in particular a process for assembling grilles formed by two sets of similar strips, with the strips of one of the sets disposed orthogonally to the strips of the other set and comprising slots which co-act with complementary slots in the other set to form a lap-jointed assembly, this being a process according to which the first set is arranged in an assembly jig equipped with parallel slots for receiving the terminal sections of the strips of the first set, after which the second set of strips is inserted one by one.

The assembly jig is displaced on fixed guide means to bring it into a position in which all the strips of the first set have their first slot disposed facing the insertion path for strips of the second set via a movable strip-insertion device, this path being orthogonal to the displacement direction of the assembly jig and defined by the fixed guide means; an appropriate strip from the second set is placed on the said movable device which is located in a retracted position; the movable device is advanced to cause it to penetrate between the strips of the first set and engage the strip of the second set at the bottom; the second set strip is released from the device; the latter is withdrawn and the sequence recommences for each strip of the second set.

According to another aspect of the invention, apparatus which enables this process to be carried out includes a sub-frame, a carriage which can be displaced on the sub-frame in a first direction, preferably vertically, a frame forming an assembly jig and attached to the carriage, a device which can be displaced on the frame perpendicular to the displacement direction of the carriage and parallel to the slots in the strips, this device comprising a table equipped with means for receiving and centering a second set strip and means allowing the frame to be held in successive predetermined positions in which the corresponding slots in the first set strips face the path of the second set strips carried by the movable device.

BRIEF DESCRIPTION OF THE DRAWINGS

The invention will be better understood by reading the following description of an embodiment of the invention, given by way of example. The description refers to the accompanying drawings, in which:

FIG. 1 is a perspective view showing a detail of a grille which constitutes a suitable field of application for the invention;

FIG. 2 is a view of a detail on a large scale, showing part of one of the strips of the grille shown in FIG. 1;

FIG. 3 is a simplified view from the front, showing apparatus according to the invention, certain parts having been removed for the sake of clarity;

FIGS. 7 and 8 show a table which forms part of the apparatus shown in FIGS. 3 and 4, viewed from above and in section with the cover raised, respectively.

DESCRIPTION OF PREFERRED EMBODIMENT

Figure 4:
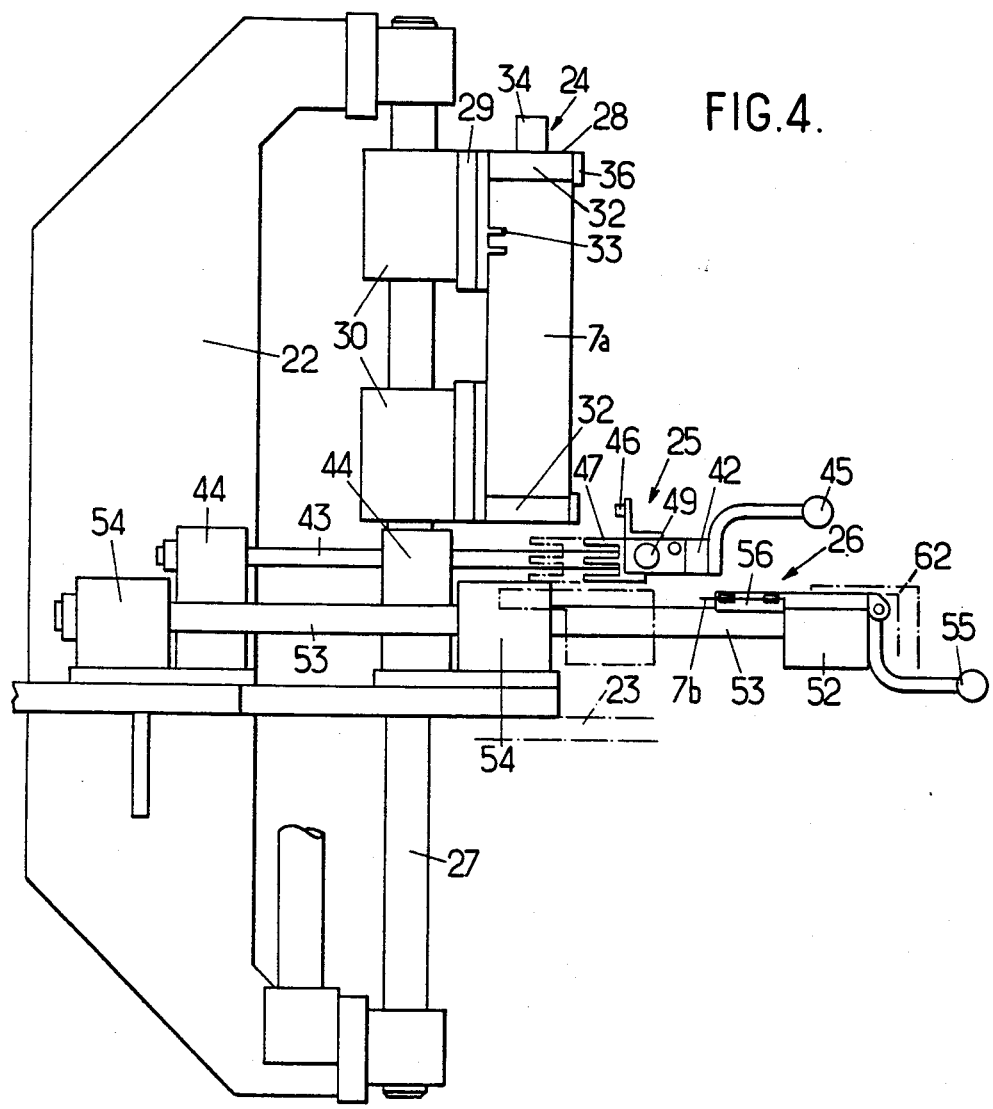
FIG. 4 is a section along the line IV—IV in FIG. 3.

Although the invention is suitable for use on grilles of very different types, reference will be made in the following to a grille having an internal part of the kind shown in FIG. 1. This grille 11 is formed by the intersection of a first set of strips 7a and a second set of strips 7b, assembled lap-jointed and welded at their intersection points 12. These strips, made for example of zirconium alloy, are formed by strips in which are provided bosses 13, guide projections or indentations 14 and notches 15. These notches 15 are intended to receive separate springs 16 (FIG. 1) which are designed to press the adjacent fuel rods (not shown) against the facing bosses 13. The invention is obviously equally suitable for use on grilles in which the separate springs 16 are replaced by sections which are stamped out of the strips themselves. In FIG. 2 additional protruberances can also be seen, projecting from the edge of the strip 7a which is opposite to that from which the assembly slots 19 are formed; these protruberances comprise, for example, small tongues 18 for attaching the grille to guide tubes associated with the framework of the fuel assembly and fins 20.

Each of the strips 7a can be lap-jointed in the complementary strips 7b, provided with slots which also extend over half the width of the strip. Engagement is guided by the bosses 14 so as to ensure, among other things, geometric regularity.

An apparatus according to the invention will now be described which enables the asssembly to be carried out. This apparatus, which is shown in its entirety in FIGS. 3 and 4, may be regarded as having:
- a sub-frame 22, intended to be fixed in a working plane shown very schematically in FIG. 4,
- a unit 24 for holding and displacing the first set of strips relative to the sub-frame in their longitudinal direction,
- a fine positioning unit 25 for the first set of strips, an insertion unit 26 for the second set of strips.

This apparatus will generally form part of a grille assembly station which also includes a mechanism for distributing the strips, which presents to the operative successively all the strips in their insertion order, to avoid errors. This mechanism may be formed by a bin conveyor with the same number of bins as there are strips, provided with step-by-step advancing means for presenting the strips in the required order. The assembly station will also include a position downstream of the apparatus 21 where the assembled internal strips receive four additional external strips which form a peripheral surround, before welding.

The sub-frame 22 is formed of square plates bearing two vertical shafts 27 which form slideways, and the drive mechanism for the holding unit 24. This unit 24 comprises a frame 28 mounted on a carriage 29 guided by four ball-bearing sleeves 30 mounted on the slides 27. The carriage is driven by a thread-and-screw or rack and pinion unit operated, in the embodiment shown, by a crank 31. Instead of a crank it would obviously be possible to use a motor, especially a stepping motor.

The frame 28 is intended to hold the strips 7a of the first set. For this purpose, the high and low sides 32 of the frame 28 are equipped with guide slots which receive the terminal sections of the strips 7a. The base of the frame is provided with abutment surfaces 33 (FIG. 4) against which the sections of the strips 7a which are not equipped with fins 20 and tongues 18 come to rest. Between the abutment surfaces there are gaps in which the fins and tongues may be accommodated.

The frame 28 being disposed vertically, the lower side 32 is used as a reference surface for aligning the strips 7a. The upper side 32 is provided with an elastic presser bar 34 which holds the strips 7a resting against the lower side with a sufficiently gentle force to avoid buckling the strips. The frame is completed by the left and right-hand sides 35 which are also provided with slots for receiving strips. Bars 36 equipped with a rapid tightening device enable the strips 7a to be held against the abutment surfaces 33 once the first set of strips has been put in place.

The left-hand side 35 of the frame 28 bears a toothed rack 37 with the same number of teeth as there are strips in the second set; this number will be assumed to be sixteen. These sixteen teeth are designed to co-act with a pawl 38 on the sub-frame 22, which pawl can be disengaged manually. These teeth enable the stopping positions of the carriage 29 during its vertical displacement to be indexed in each of the positions corresponding to the insertion of a strip from the second set. The interval between two successive teeth in the rack 37 allows the pawl 38 a certain amount of play which is used to disengage and withdraw the insertion unit 26, as will be seen later.

The right-hand side 35 of the frame bears a bar 39 provided with graduations placed in such a way that the numeral which appears opposite an index 40 on the sub-frame corresponds to the sequence number of the strip from the second set which should be inserted. In the right-hand side 35 there are also thirteen holes 41 which are part of a locking system for locking the carriage in position, as will be seen later.

The unit 25 which is intended to effect the fine positioning of the strips 7a and to place the slots in these strips at the appropriate level for the introduction of a strip 7b is shown schematically in FIG. 4. It comprises a carriage 42 fitted with guide rods 43 which are slidable in the ball-bearing sleeves 44. The carriage can thus be displaced between the positions indicated with fully-drawn lines and with broken lines in FIG. 4. In the second position a locking pin 46 which it bears engages in one of the holes 41 in the carriage 29. An operating handle 45 enables the carriage to be displaced manually.

Figure 6:
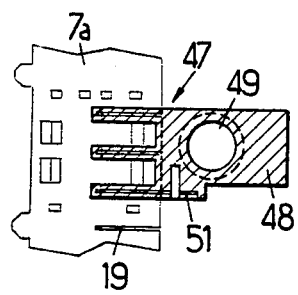
FIGS. 5 and 6 show a comb appertaining to the apparatus shown in FIGS. 3 and 4, viewed from above and in section along the line VI—VI in FIG. 5, respectively.
Figure 5:
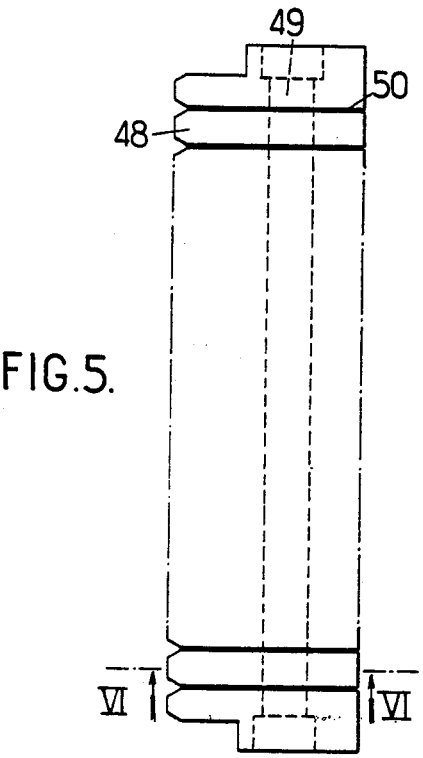

The carriage bears a comb 47, shown in detail in FIGS. 5 and 6 and formed by a stack of parts 48 with the same section, attached to an axle 49. Shims 50 with a thickness equal to the thickness of a strip 7a are placed between the parts. A blade 51 connected to the guide parts 48 engages in all the slots 19 positioned opposite, at the end of the travel of the comb 47, as shown in FIG. 6 where part of a strip 7a has been shown in fine lines. The alignment effected in this way facilitates the introduction of a horizontal strip 7b in the slots 19 positioned just below the comb.

It will be seen that the unit 25, which pushed right in, effects a number of functions: it prevents any untimely vertical displacement of the carriage 29; it maintains the spacing between the strips 7a; and it holds the slots 19 which are to receive a single strip 7b at the same vertical level.

Figure 8:
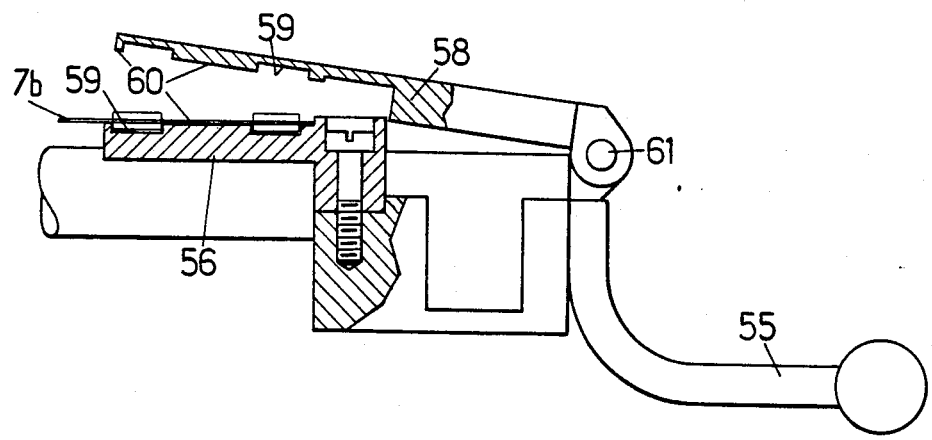

The unit 26 for inserting the second set of strips comprises a device which is movable in the horizontal direction towards the frame 28 and from the frame, the support element of which is a carriage 52 which, like the carriage 42, is fitted with two rods 53 which form slides, guided by ball-bearing sleeves 54. Displacement is controlled by means of handles 55, shown in FIGS. 4 and 7. On the carriage 52 a table 56 is fixed, being equipped with a cover 58 which can be seen better in FIGS. 7 and 8. The cover 58 is hinged around an axis 61 borne by the table. It is opened and shut by means of a controlled mechanism of any suitable type, for example by means of a reciprocating device shown schematically at 62 in FIG. 4.

The opposing faces of the table 56 and the cover 58 have areas 60 which are aligned along one plane and are designed to rest against the flat parts of a strip 7b, separated by recesses 59 for receiving the projecting parts of the strip, such as the bosses and springs. In the table 56 and the cover 58 notches 57 are formed to allow the strips 7a to pass during the advancing movement of the carriage 52.

The assembly sequence for the internal strips of a grill with the aid of the apparatus which has just been described may in particular be as follows:

With the elements of the apparatus in the position shown in fully-drawn lines in FIG. 4, the operative begins by arranging successively the sixteen strips 7a in the order they are presented to him by the bin conveyor (not shown). Each strip is arranged vertically in the frame 28 with the terminal sections engaged in the slots of the high and low sides 32, until the strip bears on the abutment surfaces 33. Once the vertical "chain" has been formed in this way, the operative immobilizes the strips 7a by means of the bars 36.

The strips 7b can then be put in position.

The operative places the first strip 7b which the bin conveyor delivers to him on the table 56, and then shuts the cover 57 again, which immobilizes the strip. The operative disengages the elastic pawl 38 of the finger 62 (FIG. 3) and lowers the carriage 29 until the numeral "1" appears in the index 40. In this position, the pawl 38 engages between the first two teeth in the rack 37 and holds the carriage in place with a small amount of vertical play. All the strips 7a then present their first slot 19 opposite the introduction path for the first strip 7b.

The operative then advances the carriage 42 of the unit 25 into the position shown in broken lines in FIG. 4. The teeth of the comb 47 position the strips relative to each other very precisely, all the slots being at the same level. At the same time, the pin 46 on the carriage 42 immobilizes in its vertical position the carriage 29 bearing the frame 28. The carriage 52 of the unit 26 is advanced in turn into the position shown in broken lines in FIG. 4, to bring the first horizontal strip 7b into an abutting position in the slots 19 of the vertical strips. The carriage 42 bearing the comb is then drawn back, thus unlocking the carriage 29 bearing the frame. The cover 57 is unlocked and the operative raises the carriage 29 again somewhat, within the limits set by the pawl 38, to disengage the strip 7b which has just been inserted from the recesses 59. The carriage 52 can then be withdrawn in order to set a new strip 7b in place.

This same operation is repeated for each of the strips which is to be inserted. However, it is useless to advance the carriage 42 of the fine positioning unit for the strips when this carriage no longer engages, i.e., in the case illustrated, for putting the last three strips in place.

This lack of fine centering is not a particular disadvantage, due to the fact that the strips 7b already in place counter-brace and hold the strips 7a precisely in place at this time.

Once all the internal strips 7a and 7b have been put in place, the assembly thus formed is transferred to the station where the external strips are put in place: the assembly is clamped between two plates by dismountable means, such as clamps and bolts. The operative puts the first external strip on the edge of the assembly in such a way that the tenons formed on the ends of the internal strips are inserted in the mortices provided in the external strip. These tenons may optionally then be bent to secure the mechanical connection. The operation is repeated three times, each time after rotation through 90°.

The complete grille formed in this way should be made monobloc; this is generally done by welding the strips together by any appropriate process.

We claim:

1. Process for assembling grilles formed from two sets of similar strips, the strips of one of said sets being disposed orthogonally to the strips of the other set and comprising slots which co-act with complementary slots in said other set to effect a lap-jointing assembly, said process comprising the steps of
    (a) arranging said first set of strips in an assembly jig equipped with parallel slots for receiving the terminal sections of the strips of said first set;
    (b) inserting the strips of said second set one by one;
    (c) said assembly jig being displaced on fixed guide means to bring it into a position in which all the strips of said first set have their first slot disposed facing an insertion path for a strip from said second set via a movable insertion device for said strips, said path being orthogonal to the displacement direction of said assembly jig and being defined by said fixed guide means;
    (d) placing an appropriate strip from said second set on said movable device located in a retracted position;
    (e) advancing said movable device to cause it to penetrate between the strips of said first set and to engage the strip of said second set;
    (f) releasing the strip of said second set from said device;
    (g) withdrawing said device; and
    (h) recommencing the sequence for each strip of said second set.

2. Process according to claim 1, wherein, before advancing said movable device, said assembly jig is immobilized and the fine positioning of said strips relative to each other is effected by means of a comb inserted between the strips of said first set.

3. Apparatus for assembling grilles formed of two sets of similar strips, the strips of one of said sets being disposed orthogonally to the strips of the other set and comprising slots which co-act with complementary slots in the strips of said other set to effect a lap-jointed assembly, said apparatus comprising
    (a) a sub-frame;
    (b) a carriage displaceable on said sub-frame in a first direction;
    (c) a frame forming an assembly jig attached to said carriage;
    (d) a device movable over said sub-frame in a direction which is orthogonal to said first direction and parallel to said slots in said strips;
    (e) said device comprising a table fitted with means for receiving and centering one strip from said second set and means for enabling said frame to be retained in successive predetermined positions in which the corresponding slots in said first set of strips face the path of the strip from said second set carried by said movable device.

4. Apparatus according to claim 3, wherein said frame retaining means comprise a second carriage displaceable parallel to said movable device, comprising a locking device positioned so as to come into engagement in co-acting means attached to said frame bearing carriage so as to immobilize it and a comb which engages between the strips of said first set so as to maintain the relative spacing between said strips and to hold the slots which are to receive one and the same strip of said second set at the same level.

5. Apparatus according to claim 4, wherein said means additionally comprise a pawl mounted on said sub-frame and co-acting with a rack mounted on said frame-bearing carriage.

6. Apparatus according to claim 5, wherein said movable device comprises a carriage equipped with a table for receiving and centering a strip from said second set, said table having areas intended to rest against the flat parts of a strip and separated by recesses intended to receive the projecting parts of said strip, means for holding the frame being designed to allow relative displacement with regard to each of the successive predetermined positions sufficient to disengage the strip of said second set from said recesses, after it has been inserted, so as to allow withdrawal of said movable device.

7. Apparatus according to claim 6, wherein said rack is designed to allow said sufficient amount of displacement, while said co-acting means attached to said second carriage and to said frame are designed to immobilize said frame-bearing carriage completely relative to said sub-frame.

8. Apparatus according to claim 3, wherein said frame and said sub-frame comprise indicating means which co-act to indicate the sequential number of the strip from said second set which is to be inserted for each of the predetermined positions of said frame-bearing carriage.

* * * * *